Sept. 15, 1931.    J. P. REMINGTON    1,823,377
DISTANT LIQUID LEVEL INDICATING APPARATUS
Filed Aug. 31, 1927
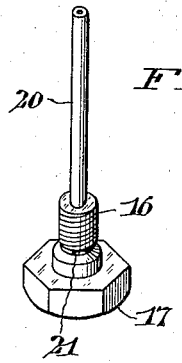
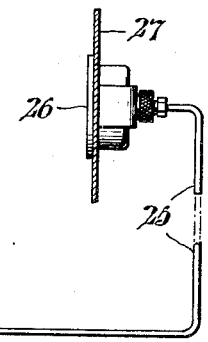
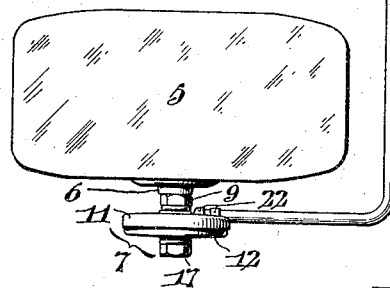
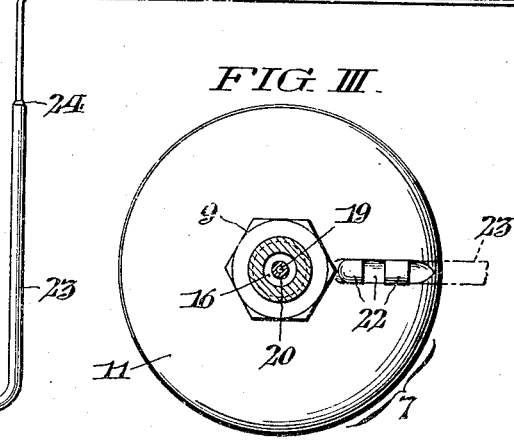
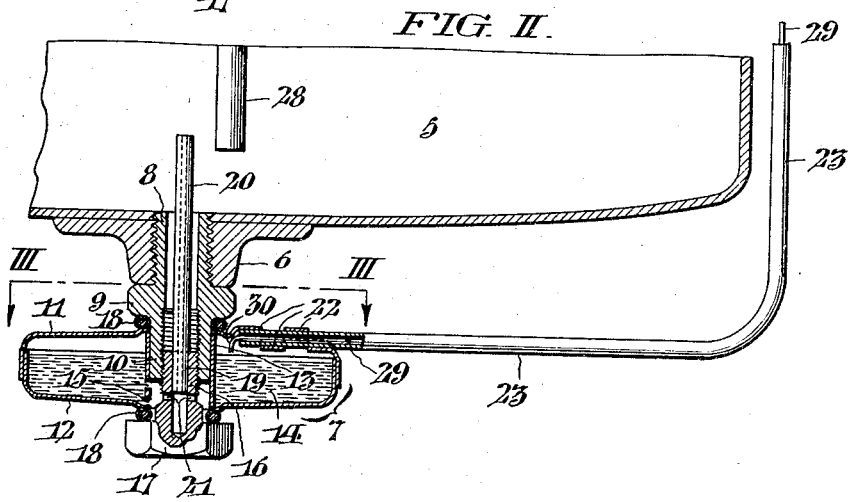
WITNESSES:
John A. Weidler
William Bell
INVENTOR,
Joseph P. Remington,
BY Fraley Paul
ATTORNEYS.

Patented Sept. 15, 1931

1,823,377

UNITED STATES PATENT OFFICE

JOSEPH P. REMINGTON, OF PHILADELPHIA, PENNSYLVANIA

DISTANT LIQUID LEVEL INDICATING APPARATUS

Application filed August 31, 1927. Serial No. 216,719.

This invention has reference to apparatus for distant liquid level indication wherein a trapped medium is employed to effect pressure manifestations on a suitable registering instrument, such as may be conveniently used for indicating the liquid level in gasoline tanks of automobiles and the like.

More specifically, the present invention relates to, what I conveniently term, a pneumatic attachment for connection into the bottom of a gasoline tank—for example—and instrumental for accurately indicating the usable contents thereof.

The primary object of my present improvements is to accomplish accurate indication of distant liquid levels in a simple and inexpensive manner.

Another object is to provide a novel means, of the typified character, effective to normally prevent water or sediment from getting into the attachment, with resultant rendering of the registering instrument inaccurate and inoperative—temporarily—should such water freeze.

A further object is to prevent globules of liquid clogging the pipe line connections from the storage to the indicating instrument, and, hence, disturbing the trapped medium with incidental rendering of said instrument temporarily inaccurate.

Other objects and advantages of my invention will be manifest as it is better understood from the following description, which, when considered in conjunction with the accompanying drawings, illustrates a practical embodiment thereof; while the subjoined claims recite those features alleged as novel and patentable.

In the drawings,

Fig. I is a broken diagrammatic-view illustrative of the application of my invention to the gasoline tank of an automobile.

Fig. II is an enlarged sectional view of the lower portion of the apparatus shown in the preceding illustration.

Fig. III is a plan view taken on the plane indicated by the arrows III—III in Fig. II; and, Fig. IV is a perspective view of a removable stand-pipe or plug insert, detached from the pneumatic attachment, and later on fully described.

Referring more in detail to the drawings, as best illustrated by Figs. I and II, a gasoline tank such as ordinarily employed on automobiles is in part indicated by the numeral 5, and it is provided with the customary drain plug connection 6, which is internally screw-threaded for reception of my novel pneumatic attachment, comprehensively designated 7.

This pneumatic attachment 7 comprises a tubular-coupler embodying an externally screw-threaded shank 8, for engagement in the connection 6 aforesaid, an intermediate polygonal section 9 for application of an appropriate manipulating tool, and an internally screw-threaded extension 10, for a purpose later on explained. The pneumatic attachment expansion chamber, per se, comprises opposed upper and lower interfitting cup-sections 11, 12, respectively, having the central portions thereof slightly embossed for co-axial reception of a tubular fitting 13, of a bore to snugly fit the extension 10, aforesaid. Obviously, the cup-sections 11, 12—when assembled—provide an enclosure 14, while the joints therebetween and the fitting 13 are appropriately sealed, whereas the latter is provided with one or more holes 15, for a purpose hereafter set forth.

Threadedly engaging the coupler extension 10 is the tubular shank 16 of a lock-stud or screw-plug 17, and said stud—as will be best seen from Fig. II—serves to rigidly secure the pneumatic attachment 7, which I preferably term and will hereinafter refer to as the horizontal expansion chamber, to the coupler extension 10 aforesaid, with interposition of copper-shrouded compressible-gaskets 18, effective to ensure liquid as well as gas-tight joints. The lock-stud or screw-plug 17 has frictionally—or otherwise—fitted into its bore 19, a length of tubing 20, of comparatively fine bore, that serves as a stand pipe—as later on explained, while communication between this tube 20 into the expansion chamber tubular section 13 is afforded by way of one or more holes 21, and, from thence, into the expansion chamber 14, through the hole or holes 15, aforesaid. It is to be noted that the annular space within the tubular fitting 13 intervening the holes 15, 21 serves as a choke or retarding check upon the flow of gasolene from the storage tank 5 into the expansion chamber 14.

Sealed into the upper cup section 11, of the expansion chamber 14, and radially retained with respect thereto by means of reversely joggled—or stamped out—integral straps 22, is an elbowed pipe 23, suitably plugged at 24 Fig. I to concentrically receive, and seal thereinto, one end of a comparatively small bore tube 25 that connects into a low-pressure indicating gauge 26, attached on the instrument board or dash 27 of an automobile, in conventional manner.

In using my novel attachment, if a trapped pocket of air—for example—is provided in connection with the pipe line 23, 25, leading from the bottom of the supply tank 5, to the indicating instrument 26, that is to say—more specifically—in the expansion chamber 14, and the amount of air thus pocketed is greater than the variations which may occur in the total amount of air in the pneumatic system, then the indicating instrument 26 will not register the changes in volume of air due to temperature, barometric, vapor density or other variables, because all these changes can occur without permitting the gasoline to rise above the top of such air pocket. Hence, the gasoline will be prevented from getting up into the pipe line 23, 25, leading from the horizontal expansion chamber 7, to the indicating gauge 26, and therefore, no considerable counterbalancing effect upon the head of gasoline in the supply tank 5, can accrue. Therefore the only change in the pointer position on the dial of the gauge 26, which can be indicated, would be incident to the minute amount of rise or fall of the trapped air in the expansion chamber 14.

Furthermore, by my novel construction of pneumatic attachment 7, I find that the rising of gasoline into the gauge system is under all normal conditions effectively prevented, providing the relative proportion of air in the pipe line 23, 25 to the volume of air in the expansion chamber 14 is properly proportioned, and that said expansion chamber is made shallow and of a horizontal cross-sectional area sufficiently large at the liquid line relative to the proportions of the associated parts to offset volumetric change from indicating readable variations in pointer position on the gauge 26.

Incidentally, the tube or stand pipe 20 projecting into the supply tank 5 is of a length to terminate slightly above the bottom of the carbureter fuel feed pipe 28 so as to normally prevent water from ever getting into the expansion chamber 14, and it will be noted that should water rise to a considerable height in the bottom of the tank 5, it would be consumed through the carbureter before it could enter said stand pipe. This phase of the invention also applies to the usual tank residues. Obviously by removing the lock-stud or plug 17, to which the screw stand pipe 20 is fixed, water and sediment can be drained out of the tank 5, without dismantling the entire attachment 7.

In practice, I have found it desirable to use a continuous length of tubing 23—of approximately the same outside diameter ordinarily employed, but of larger bore—between the expansion chamber 7 and the gauge or indicating instrument 26, for two important reasons. Such tubing being made thinner walled—and consequently cheaper—dispenses with the two part construction 23, 25, and obviates the danger of vibration fracturing the seal at 24. When a single tube 23 is employed, I insert therein a wire 29—of a gauge approximately half the diameter of such tube bore—which extends throughout its entire length from the instrument 26 to the expansion chamber 7, with provision of a terminal protrusion 30, for a purpose later on explained.

The main advantage accruing to the use of light and cheap tubing 23 is that it not only facilitates bending of the same, but the support afforded by the insert wire 29 effectively prevents collapse or closure of said tubing by accidental blows. Furthermore, the insert wire 29 functions as a means of distributing any condensed liquid fuel in the pipe line 23 and prevents it from lodging therein, as a clogging or disturbing medium. Incidentally, I have noted that a drop of gasoline adhering to the free end of the pipe line 23—where it connects into the expansion chamber 7—will be drawn thereinto by the sudden chilling of said pipe line, due to the cooling of the motor, and that when such drop of gasoline was drawn up into the vertical sections of such line, it actually pulled the gauge pointer down. By the use of the insert wire 29, in the pipe line 23, I find small bubbles of air pass the indrawn drop of gasoline thus equalizing the pressures above and below said drop; and, as the wire 29 extends beyond the open end of the pipe 23 into the expansion chamber 7, it conducts the drop of gasoline back into the liquid in said chamber as it drops off the terminal end 30, with total elimination of any clogging impedimenta tending to disturb accuracy of the gauge indications.

Another advantage, which the wire 29 ensures, is that it permits the displacement of the air in the pipe line 23, so that a proper balance between the total amount of air in the system, and the amount in the expansion chamber 7, may be varied to suit special conditions without changing the outside diameter of the pipe line, 23, used.

From the foregoing my invention will be clearly understood and, while I have illustrated and described one practical embodiment thereof with some particularity, I also realize that—in practice—various changes therein may be made without departing from its generic aspects. Accordingly, the right is hereby reserved to effect such changes in the construction, or otherwise alter the arrangement of the correlated parts, as are fairly encompassed by reasonable interpretation accorded the subjoined claims.

Having thus described my invention, what I claim is:—

1. A pneumatic attachment for distant liquid level indicating systems comprising a tubular coupler, a shallow expansion chamber seating on the coupler, and a removable stand pipe device securing the expansion chamber to the coupler with provision of a flow choking connection therebetween.

2. A pneumatic attachment for distant liquid level indicating apparatus comprising a tubular coupler having a manipulating head intermediate externally and internally screw-threaded portions thereof, an expansion chamber fitting the external part of the internally-threaded portion of the coupler, a clamping screw embodying a stand pipe co-axial with said coupler, there being means affording communication between the stand pipe and expansion chamber, and said clamping screw serving to secure the expansion chamber in place.

3. A pneumatic attachment for distant liquid level indicating apparatus comprising a tubular coupler having a manipulating head intermediate externally and internally screw-threaded portions thereof, a comparatively shallow expansion chamber having an inner wall fitting the external part of the internally-threaded portion of the coupler, a clamping device consisting of a lock-screw with a tubular shank and an aligned co-axial stand pipe, said device being functional to secure the expansion chamber to the tubular coupler, and said screw shank and expansion chamber inner wall having orifices affording flow connection therebetween.

4. A pneumatic attachment for distant liquid level indicating apparatus comprising a tubular coupler having a manipulating head intermediate externally and internally screw-threaded portions thereof, a comparatively shallow expansion chamber consisting of opposed cup-sections with a co-axial connecting sleeve, said sleeve fitting the external part of the internally-threaded portion of the coupler, a clamping screw having a tubular shank with a co-axial stand pipe projecting beyond the externally-threaded portion of the coupler, said clamping screw serving to secure the expansion chamber to the tubular coupler, and the tubular shank and co-axial sleeve of the expansion chamber having orifices affording flow connection therebetween.

5. A pneumatic attachment for distant liquid level indicating apparatus comprising a tubular coupler having a manipulating head intermediate externally and internally screw-threaded portions thereof, a comparatively shallow expansion chamber consisting of opposed interfitting cup-sections with a co-axial connecting sleeve, said sleeve fitting the external part of the internally-threaded portion of the coupler, a clamping screw having a tubular shank with a co-axial stand pipe projecting beyond the externally-threaded portion of the coupler, the tubular shank and co-axial sleeve having pin-holes affording choke communication from the stand pipe into the expansion chamber aforesaid, and said clamping screw serving to secure the expansion chamber to the tubular coupler.

6. A pneumatic attachment for distant liquid level indicating apparatus comprising a tubular coupler having a manipulating head intermediate externally and internally screw-threaded portions thereof, a comparatively shallow expansion chamber consisting of opposed interfitting cup-sections with a co-axial connecting sleeve, metal-shrouded gaskets adapted to the ends of the sleeve, said sleeve fitting the external part of the internally-threaded portion of the coupler, a clamping screw securing the expansion chamber to the coupler with interposition of the metal-shrouded gaskets aforesaid, said screw having a tubular shank with an aligned co-axial stand pipe of fine bore, and the co-axial sleeve and tubular shank having passages affording restricted communication between the stand pipe and the expansion chamber, for the purpose specified.

7. A pneumatic attachment for distant liquid level indicating apparatus comprising a tubular coupler having a manipulating head intermediate externally and internally screw-threaded portions thereof, a comparatively shallow expansion chamber consisting of opposed interfitting cup-sections with a co-axial connecting sleeve, metal-shrouded gaskets adapted to the ends of the sleeve, said sleeve fitting the external part of the internally-threaded portion of the coupler, a clamping screw securing the expansion chamber to the coupler with interposition of the metal-shrouded gaskets aforesaid, said screw having a tubular shank with an aligned co-axial stand pipe of fine bore, the screw shank and expansion chamber sleeve having pin-holes affording choke communication from the stand pipe into said chamber, a fluid-trapping connection from the expansion chamber to an indicator gage, and reversely joggled straps integral with the upper of the expansion chamber cup-sections for sealable attachment thereinto of the fluid-head trapping-connection aforesaid.

8. In a liquid level indicating system comprising an indicator gauge and a pipe line connecting such gauge to a distant storage of the liquid, said pipe line being adapted to trap a head of air as the pressure transmitting medium, the combination of a comparatively shallow expansion chamber having an inner wall and having a stand pipe connection into the storage of liquid, said chamber serving to confine a portion of the measuring medium horizontally over a relatively large area, said expansion chamber inner wall and stand pipe connection having passages affording ingress of liquid from the storage to the expansion chamber and the stand pipe portion normally preventing access of water or sediment thereinto, and an insert wire extending through the pipe line from the gauge into the expansion chamber with provision of a terminal protrusion, for the purposes specified.

9. A gasoline level indicating system for the storage tanks of automobiles and the like comprising an indicator gauge and a pipe line connecting such gauge to the gasoline tank, said pipe serving to trap a head of atmospheric air as the pressure transmitting medium, an expansion chamber adapted to confine a portion of the pressure transmitting medium horizontally, a stand pipe flow connection intermediate the expansion chamber and gasoline tank which projects above the bottom of the carburetor feed line from the fuel storage tank, and an insert wire coextensive with the pipe line that serves to prevent clogging by entering globules of liquid and incidentally maintains a proper balance of air between the total amount in the system and that in the expansion chamber.

10. In a liquid level indicating system comprising an indicator gauge and a pipe line connected to a distant storage tank of the liquid, said pipe line trapping a head of fluid as the pressure transmitting medium; the combination of a comparatively shallow expansion chamber having an inner wall and functional to confine a portion of such pressure transmitting medium to a relatively large area, and a hollow connection from the storage tank to the expansion chamber setting-apart an annular space intermediate said connection and the expansion chamber inner wall, and the connection and inner wall having apertures affording intercommunication between said connection and said chamber and effective as a retarding check to liquid flow from said storage tank into the expansion chamber.

11. In a liquid level indicating system comprising an indicator gauge and a pipe line connection to a distant storage tank of the liquid, said pipe line trapping a head of fluid as the pressure transmitting medium; the combination of a comparatively shallow expansion chamber having a tubular inner wall and functional to confine a portion of such pressure transmitting medium to a relatively large area, a hollow connection from the storage tank to the expansion chamber setting-apart an annular space intermediate said connection and the expansion chamber inner wall, such connection and inner wall having small apertures affording intercommunication between the connection and the chamber and effective as a retarding check to liquid flow from said storage tank into the expansion chamber, and said connection including a co-axial stand pipe serviceable to prevent overflow into the expansion chamber of matter from the storage tank that would disturb the accuracy of the indicator gauge readings.

In testimony whereof, I have hereunto signed my name at Philadelphia, Pennsylvania, this 22nd day of August, 1927.

JOSEPH P. REMINGTON.